United States Patent
Kinai et al.

(10) Patent No.: US 11,568,087 B2
(45) Date of Patent: Jan. 31, 2023

(54) CONTEXTUAL API CAPTCHA

(71) Applicant: International Business Machines Corporation, Armonk, NY (US)

(72) Inventors: Andrew Kinai, Nairobi (KE); Komminist Weldemariam, Ottawa (CA); Maja Vukovic, New York, NY (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 16/419,368

(22) Filed: May 22, 2019

(65) Prior Publication Data
US 2020/0372162 A1   Nov. 26, 2020

(51) Int. Cl.
G06F 21/62 (2013.01)
G06F 9/54 (2006.01)
G06N 20/00 (2019.01)

(52) U.S. Cl.
CPC .............. *G06F 21/629* (2013.01); *G06F 9/54* (2013.01); *G06N 20/00* (2019.01); *G06F 2221/2103* (2013.01)

(58) Field of Classification Search
CPC ................................................... G06F 21/629
See application file for complete search history.

(56) References Cited

U.S. PATENT DOCUMENTS

| | | | |
|---|---|---|---|
| 9,021,443 B1 | 4/2015 | Lachwani et al. | |
| 9,104,525 B2 | 8/2015 | Dang et al. | |
| 9,146,787 B2 | 9/2015 | Zhu et al. | |
| 9,329,878 B2 | 5/2016 | Hong et al. | |
| 9,723,005 B1 | 8/2017 | McInerny et al. | |
| 2014/0020046 A1* | 1/2014 | Heitzman | H04L 63/1433 726/1 |
| 2015/0095923 A1 | 4/2015 | Sarid | |
| 2015/0169386 A1 | 6/2015 | Gopalraj et al. | |
| 2015/0222504 A1 | 8/2015 | Srivastava | |
| 2017/0083691 A1 | 3/2017 | Chan et al. | |
| 2017/0201548 A1* | 7/2017 | Kinder | H04L 41/0813 |
| 2017/0244709 A1* | 8/2017 | Jhingran | H04L 63/08 |
| 2018/0239893 A1 | 8/2018 | Fedor | |
| 2019/0018937 A1 | 1/2019 | Jadhav | |

FOREIGN PATENT DOCUMENTS

WO    2016/028547 A1    2/2016

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.
(Continued)

*Primary Examiner* — Simon P Kanaan
(74) *Attorney, Agent, or Firm* — Scully, Scott, Murphy & Presser, P.C.; Shimon Benjamin (57) ABSTRACT

A request for use of an application programming interface (API) is received. Context associated with the request is determined. Based on the context, a challenge is generated, which can be used for determining whether to permit the use of the API. A response to the challenge is received. Based on the response, the request can be facilitated for using the API.

20 Claims, 8 Drawing Sheets

(56) References Cited

OTHER PUBLICATIONS

Beal, V., "API—application program interface", http://www.webopedia.com/TERM/A/API.html, webopedia An eWEEK Property, Accessed on May 22, 2019, 2 pages.
Oracle, "Oracle® Fusion Middleware Introduction to API Gateway OAuth 2.0", https://docs.oracle.com/cd/E50612_01/doc.11122/oauth_guide/content/oauth_intro.html, Accessed on May 22, 2019, 3 pages.
Sandoval, K., "Your API is Vulnerable if These 4 Risks Aren't Mitigated", http://nordicapis.com/your-api-is-vulnerable-if-these-4-risks-arent-mitigated/, Sep. 17, 2015, Updated on Feb. 2, 2018, Accessed on May 22, 2019, 16 pages.

\* cited by examiner

CONTEXTUAL API CAPTCHA

BACKGROUND

The present disclosure relates generally to computers and computer applications, and more particularly to providing a challenge or a test in permitting a use of an application programming interface (API).

An application programming interface (API) in computer programming can be a set of routines, protocols, and tools for building software and applications. An API provides building blocks for software or an application, which can then be put together by the programmer. There are many types of APIs. For example, an API may be for a web-based system or web sites, operating system, database system, computer hardware, and/or software library.

BRIEF SUMMARY

A system, in one aspect, may include a hardware processor. A memory may be coupled to the hardware processor. The hardware processor may be operable to receive a request for use of an application programming interface (API). The hardware processor may be further operable to determine context associated with the request. The hardware processor may be further operable to, based on the context, generate a challenge for determining whether to permit the use of the API. The hardware processor may be further operable to receive a response to the challenge. The hardware processor may be further operable to, based on the response, facilitate the request for using the API.

A computer-implement method, in one aspect, may include receiving a request for use of an application programming interface (API). The method may also include determining context associated with the request. The method may further include based on the context, generating a challenge for determining whether to permit the use of the API. The method may also include receiving a response to the challenge. The method may further include, based on the response, facilitating the request for using the API.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In embodiments, a system, method and techniques are disclosed, which can detect a user request for use of an application programming interface (API). For example, a system can analyze information associated with the request and/or a requester of the request, and based on the analysis, can generate or derive a challenge or test (also referred to as an API CAPTCHA in the present disclosure) for presenting to the requester. The system receives the requester's response, and based on the response (e.g., whether the response satisfies the test), the system may facilitate the use of the API, for example, trigger an action which may permit or deny the use of the API. The system analyzing information associated with the request and/or a requester of the request can include determining context associated with the request and/or a requester. Context may include knowledge level and/or skill associated with the requester, one or more previous responses to one or more previous challenges presented to the requester, for example, with respect to the API or related APIs. Based on correlating such context information, the system may derive API context driven CAPTCHA and provide variably adaptive and modified challenges for the user(s).

Completely automated public Turing test to tell computers and humans apart ("CAPTCHA") is a type of challenge-response test, traditionally used in computing to determine whether or not the user is human. For instance, CAPTCHA is traditionally used to protect web sites against bots by generating and grading tests that humans can pass but automated programs currently cannot. The present disclosure herein uses the term CAPTCHA in an extended fashion so as to refer to a probe or test (e.g., a quick probe or test) of a potential API user, for example, to demonstrate that the potential API user has an understanding of one or more aspects of the API, for instance, regardless of whether the potential API use is a human or a machine.

In some embodiments, the CAPTCHA or the API CAPTCHA may be one or more questions related to the API (e.g., its features, uses, risks, etc.). In some embodiments, such a challenge-response test may include asking the requester of the API to perform an action related to programming and programming skills. An example of an action requested may include asking the requester to code one or more lines of a program associated with the API or usage of the API, for instance, so that the requester can demonstrate knowledge associated with the API such as knowledge of risk and security associated with the API.

In some embodiments, facilitating the request can include triggering an action which may permit the use of the API, permit access to more information related to the API, permit access to one or more advanced features of the API, and/or allowing other dependent API usage. Other actions may be triggered to facilitate the request to use the API. Facilitating the request may also include denying the use of the API, for example, based on the response not satisfactorily meeting a criterion or not passing the challenge or test.

In some embodiments, the trigger for the API challenge-response test (e.g., initiate generation of a challenge and causing the challenge to be presented, receiving and analyzing the response to the challenge) may be based on: a request by a user (e.g., to use the API), a location of a user (e.g., in a work setting or at home), a speed of programming by a user (e.g., an indication of skill level, coding speed), or a distraction level of the user given the risk level of the target system or any combinations thereof. As an example, a distraction level of the user can be determined using a computer vision technique, e.g., running in a camera module, which may be ingesting the features pertaining to visual cues of the user and determining the time frames during which the distraction level of the user falls to a predefined or given threshold. The output of a computer vision model in conjunction with the user profile (e.g., skill/knowledge level, experience, specialty of the developer based on previously developed systems, applications, and/or modules, etc., programming speed, etc.) may be fed to a support vector machine (SVM) classifier to determine the distraction level on varying thresholds and triggering the API CAPTCHA at optimal time. The distraction level of the user can also be inferred from the user task switching behavior, interaction or engagement. Speed of programming may be detected by a programming environment or tool which may provide a graphical user interface window or editor for a user to enter or type in a code. One or more other factors may trigger the API CAPTCHA.

In some embodiments, the API challenge-response test can be context dependent, based on analysis of intended usage. The API challenge-response test can apply to more than one API, e.g., a set of related APIs.

It is possible that weak points in an API construct can expose customer data, backend server appliances, and other systems to unauthorized access, putting APIs and businesses at risk. APIs thus also can be a target for activities that seek to compromise a computer, system or service. The system and method for API CAPTCHA or challenge-response test in some embodiments allows for API management and help organizations boost their API security.

The system and method can provide access to an API. For example, the system can authenticate a developer account for a networked application, confirm a validity of a developer provided code (or puzzle), wherein the code (or puzzle) may take one or more forms, but not limited to the following, e.g.: a) be visible on the real object, b) represent a real-world challenge, and/or c) represent a virtual challenge. The code may take one or more other forms. The system may validate the code. For example, the system can have an expected output which is pre-labeled based on crowdsourced data by extracting and/or mining real world puzzles that have been successfully solved by artificial intelligence (AI) agents. New test cases can be generated using a reinforcement learning model and the previous labeled outputs can assist in validating the code using confusion matrix or R-squared method. Responsive to verifying or confirming the validity of the code, the user or the user program can be granted access to the API for use in the networked application. As a result, developers are enabled to consume one or more APIs.

As an example use case scenario, a code or set of codes may be projected on user's surroundings, for example, presented or displayed on a user interface on a user device such as a computer. As another example, the system in some embodiments can provide a challenge in real world against real objects, which may correspond to virtual objects such as desired APIs. For instance, for triggering one or more APIs for managing loyalty points for a retail store, the code developer (requester of API use) may be tasked with visiting a store (e.g., virtually or via the store's web site) or identifying an object (e.g., from a selection of objects provided to the code developer) that is sold in a given store.

As another example, the code developer may be tasked with finding the improper use of the desired API. For example, different usage patterns may be presented to the code developer and the code developer may be asked to select and/or label proper usage and/or improper usage patterns in the choices of the different usage patterns. Such a challenge may serve to ensure that the developer understands proper use of the API. As a further example, a challenge-response test may ask the developer to find or expose potential vulnerability in an API. Through the analysis of a sequence of challenge-response tests or cohort of historical challenge-responses data, the system can also detect possibly vulnerabilities in APIs. In one embodiment, the method of analyzing the sequence of challenge-response tests or cohort of historical challenge-responses data may use a combination of techniques from static code analysis and machine learning (e.g., Principal Component Analysis). Based on the analyzed sequence of challenge-response data, patterns of API usage can be inferred and used to guide the search for vulnerabilities in APIs.

The system and method in some embodiments can also help to identify a developer's knowledge, for example, to the developer. For example, by allowing the developer to answer one or more challenge or test questions about the API or use of API, the developer can confirm the developer's knowledge of the API before the developer starts to use the API. In some embodiments, the system is fully automated, and can provide a type of a "certification" exam for a user (e.g., a crowd sourcing participant) before the user can participate in a crowd sourcing task online.

In some embodiment, the system may request the developer to provide a possible test case or set of test cases for the API, for example, using a graphical user interface (GUI). The system may execute the developer provided test case and present or cause to be presented via the GUI, at least some of the execution trace of the test case. The system may generate a follow-up challenge based on the test case execution trace. For example, a challenge may include asking the developer to complete the execution trace, e.g., "please complete the remaining part of the execution trace." If the quality of the developer test case is determined to be above a threshold, the developer may be allowed or permitted to use the API, and for example, and associated documentation.

The complexity of the code can be a function of users typing speed, number of functions developed, count of open-source entries and sentiment analysis on the previous recognition of the user based on code types and/or test cases extracted using topic modeling through latent Dirichlet allocation (LDA) algorithm infused with natural language processing (NLP).

For one or more developers who pass the test or challenge, the system may also offer "hidden" API features. Using an API via the API CAPTCHA may also allow users to be able to access advanced and/or new features related to the API. The system may also act as a filter in allowing API usage. For instance, users that do not pass the challenge (e.g., do not possess knowledge in one or more dimensions associated with the API) may not be able to use the API. In another aspect, the system may learn about the users via the question-response processes.

In some embodiments, the system can observe and learn from the developer's interaction with APIs and can use that information to improve or enhance the challenge-response tests. For instance, based on the past usage of the API by a user and/or past interactions with the user, challenges may be made or complex. As another example, based on the past usage of the API by a user and/or past interactions with the user, access to the API may be granted on a limited basis, for example, only offer a basic set of action, but not the full version. So example, while the system may appear to grant the access to the API, a limited set of functions or actions can be allowed. Yet as another example, based on the past usage of the API by a user and/or past interactions with the user, the system may limit access to a data set, for example, exposing or allowing access to only a subset of data or dummy data set. Learning may utilize regression learning or another machine learning technique. In regression learning, past data is fitted to a model, which model can then be used to make future predictions.

The system in some embodiments takes into consideration the intended usage of the API in generating a challenge, test or question. In some embodiments, the system may learn the intended usage. A number of techniques may be used to learn the intended usage. For example, the system may learn the intended usage via one or more question and answer sessions with developer or user, for instance, asking the developer the intended usage or reason for using the API. The system may also learn the intended usage by accessing and analyzing information and/or data about the intended system of use and/or context (e.g., banking application, social media application, etc.) from a project repository (e.g., program or integrated development environment, version control system for software development, etc.). The system may also learn the intended usage by analyzing the developer cohort (e.g., experience, skill, knowledge level, specialty of the developer based on previously developed systems, applications, and/or modules, etc.). In some embodiments, the system may modify the challenge based on the learned intended usage. In some embodiment, the system may also alter or cause to be altered, the rate in which the challenge-response test is presented to the user.

Examples of intended usage of an API may include, but are not limited to: to manage hierarchical access control list (which may interact with sensitive data), to analyze large dataset (e.g., advanced deep-learning API), to interpret analytics results, to display analytics results on GUI or control data on GUI, and/or others. Other intended usages may apply to APIs, for example, based on the functions or purposes of the APIs.

In some embodiments, the system may employ one or more machine learning models and/or prediction algorithms to anticipate API use requests, for instance, based on the behavior of developers within the social network. For example, developers can be connected through code development environments, groups, and/or forums. The system in some embodiments can identify which developers work on similar applications and use similar APIs and thereby learn about cohorts of developers and adapt the challenge-response tests accordingly.

Figure 3:
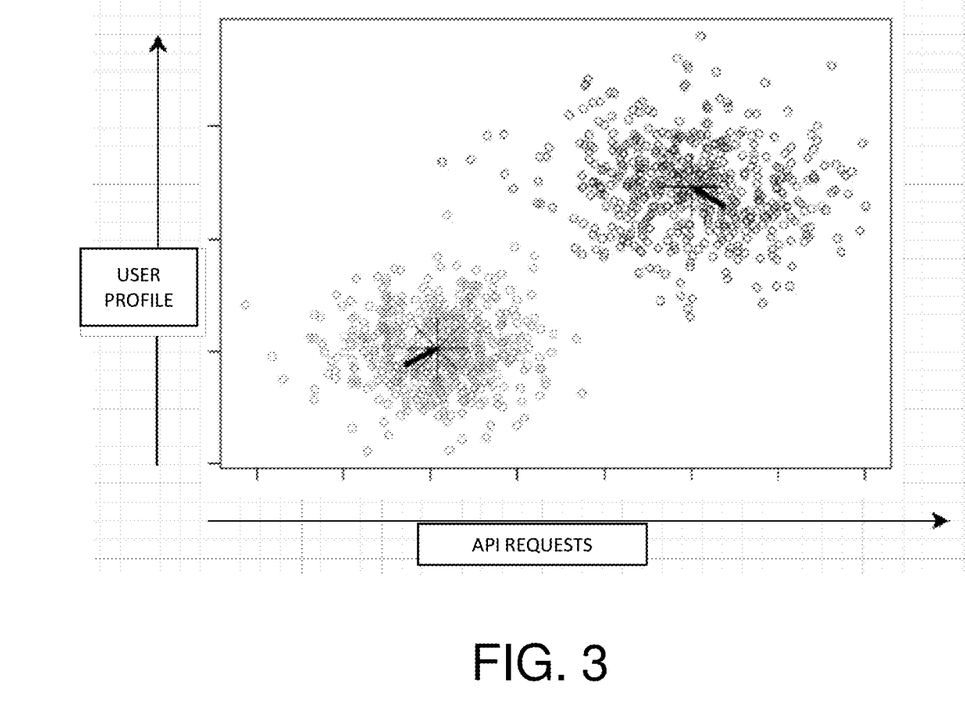
FIG. 3 shows clusters of user profiles and API requests in one embodiment.

In some embodiments, K-means clustering can be used to cluster profiles of different users in correlation with APIs being used by the users for their respective applications. FIG. 3 shows clusters of user profiles and API requests in one embodiment. In some embodiments, the challenge-response test questions may be stored in a question bank, for a local storage, remote storage, cloud, and/or on blockchain for immutability.

In operation, in some embodiments, the system (e.g., an API monitoring module executing on a computer processor) may detect access or call to an API, and in response, the module may access a database that keeps track of the developer's experience or skill level, a social network forum, and/or a development environment associated with the developer.

In some embodiments, the system may implement an identity management module to detect and/or prevent any user misuse. A module executable on a computer processor may use voice, image, token, and/or another, based user authentication. Depending on the risk or profile of the intended use (e.g., the intended use of the API is for a high profile system, the system may monitor, for example, without compromising the security of the developer, the interaction, engagement and/or behavior of the developer during the challenge or test taking process.

Consider that a developer is using a program development/version control environment tool or service. Consider that the developer program via the program development/version control environment, a request to deliver a report and the request includes executing (using) an API associated with the program development/version control environment. In some embodiments, the request would not proceed and alert the user immediately based on understanding that the API is being requested by the user in order to use it in the user's application. An interception layer can be inserted, for example, in the program development environment tool, where the user is presented with a CAPTHCA challenge (challenge-response test) dynamically before the request can be executed. Responsive to the user solving the CAPTCHA challenge (e.g., popped on the display screen), the system may allow the program to proceed.

In some embodiments, the system may utilize one or more natural language processing technique and semantic context understanding to understand the redundancy of calling similar API requests. In an application where similar or same API is used multiple times, the system may allow for configuring the frequency with which the challenge-response test should be interjected. Such frequency may be configured based on a user defined rule regarding using a common API in different parts or modules of one's code. So, for example, if an API has been called again in the same piece of code, the system can contextually understand that the same API has been called twice or multiple times and may not present or pop-up another challenge-response test to the user for calling the same API.

Figure 4:
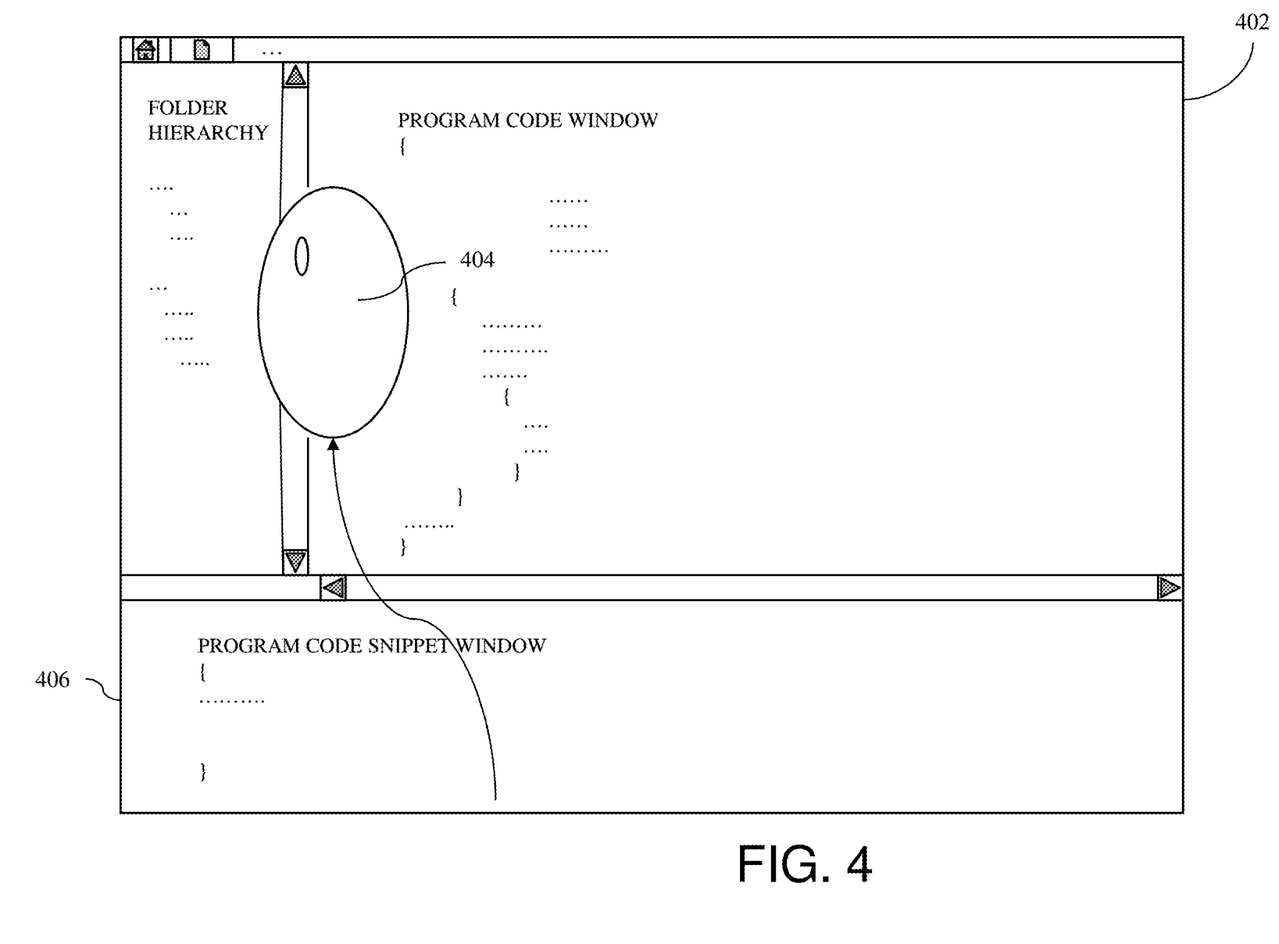
FIG. 4 shows an example of presenting a challenge-response test question in one embodiment.

In some embodiments, the challenge-response test may be an audio message. As another example, the challenge-response test may be a pop-up displayed or presented as part of a GUI in a program code editor. FIG. 4 shows an example of presenting a challenge-response test question in one embodiment. A challenge-response test question, for example, may be presented on a display screen on a GUI 402, for example, as a pop-up in a balloon graphics 404 in a code editor 406 in one embodiment.

In some embodiments, the challenge-response test is context dependent. For example, if the API relates to an API for a web-application mashup service, the CAPTCHA may include one or more queries relating to Web use. Some CAPTCHA queries may relate to versioning, for instance, if the user is determined to be familiar with a back level version of an API, but not a new API. In some embodiments, the challenge-response test message or question may relate to the user cohort and/or programmer role in an organization. For example, the message or question may change depending on programmer experience and history.

The type of a response may be based on the type of a challenge that is presented. For example, the user may be asked to click or select a control in a user interface to demonstrate a kind of knowledge related to GUI APIs.

API CAPTCHAs may be desirable when APIs can be unintentionally exposed and allow for potentially undesirable use of resources. Consider an API call filtering system, configured to monitor API call requests received via an endpoint and API call responses received via a supporting service of an API or web service. The API call filtering system enables enterprises to improve their security posture by identifying, studying, reporting, and securing their APIs within their enterprise network. When a risk level is exceeded, the API CAPTCHA may be triggered.

Detecting API usage or API usage patterns may include mining source code and/or other arenas such as tools providing services that expose APIs, for example, which allow for receiving a request for a client for calling an API for a service, and dynamically generating the client for the API for the service.

The challenge-response test in some embodiments can be triggered based on usage patterns and frequencies. As an example, frequently occurring API usage patterns may be determined from API call data collected from across an API ecosystem. As another example, a classification structure, such as a decision tree, may be generated from the API usage patterns. A type of activity that resulted in a set of API calls being invoked may be determined from the classification structure. A similarity or difference between the set of API calls and the frequently occurring API usage patterns may also be determined and/or identified. In one aspect, API service providers can learn about their API users via the challenge-response test, for example, users' knowledge levels, skills, and context.

The system in some embodiments can improve the dynamic learning of the challenge-response test over time and make it more secure. The system can vary the challenge-response test for an API, for example, for a given user, based on monitoring the previous challenges that have been completed by the user in the past and by dynamically modifying the challenges for the future. This can ensure that the user cannot memorize the previous challenge (like completing a puzzle or a math problem). Based on APIs used, the challenge can be correlated with the API context in correlation with user's competency level. Thus, a different challenge can be provided based on different context.

As an example, consider a user requesting to use Numpy library, a package for scientific computing in Python, for time series based graphical analysis. As a challenge-response test or CHATCHA, the user can be provided with a numerical trigonometric challenge. As another example of a challenge, a visual pop-up can be generated where the user is asked to draw a graph. In this example, a region-based convolutional neural network (R-CNN) may be used to recognize the drawing that has been created by the user for inspection with the correct answer to the challenge. The drawing may be converted into a static image and size normalization may be applied to gather the intended scaling of the design for accurate inspection. Yet as another example, a user can be provided a triangle and asked to apply the Pythagoras theorem on the right-angle triangle in order to compute the third side of the triangle. By answering the challenge correctly, user can be allowed to use the Numpy library and the library's associated APIs for graphical analysis. As another example, the library being used by the user can be subdivided into different blocks of API's that the user wants to access, one at a time, and for example, every time the user attempts to call the library for a specific function, a challenge can be provided to the user in an adaptive format where the challenge can vary based on the frequency of usage of that library, and based on different context and functions associated therewith.

Figure 1:
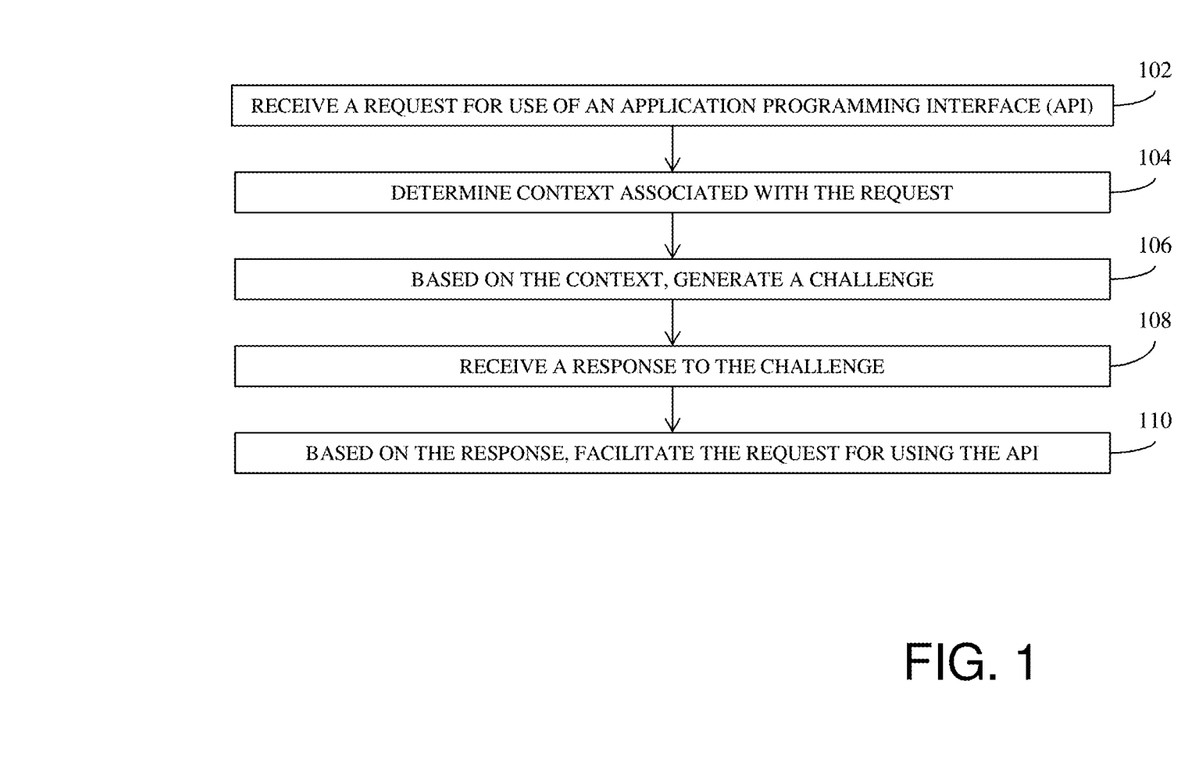
FIG. 1 is a flow diagram illustrating a method in one embodiment.

FIG. 1 is a flow diagram illustrating a method in one embodiment. The method can be performed by one or more hardware processors, which may be operably coupled to a memory device. At 102, a hardware processor may receive a request for use of an application programming interface (API). The request may include a request for using a set of APIs, for example, one or more APIs. For instance, the request may be received based on automatically detecting an API call in a code or program. As another example, the request may be received based on automatically detecting an execution or run of a function or tool which includes a call to an API.

At 104, the hardware processor may determine context associated with the request. For example, the hardware processor may analyze information associated with the request, for instance, who is requesting the use of the API, the type of the API, the functions of the API, a past or historical usage pattern of the API by the requester or a group of requesters, and/or other information. For example, the context may be context associated with a requester of the request. The context may also include information associated with a previous challenge presented to a request of the request. The hardware processor may learn intended usage of the API, for example, using some or all of the information. The hardware processor may learn the intended usage of the API by accessing data associated with a programming project in a project repository with which the request is associated. The hardware processor may learn the intended usage of the API by causing a user interface to interact with the requester associated with the request, and receiving data from the interaction, wherein based on the data the hardware processor may learn the intended usage of the API.

At 106, based on the context, the hardware processor may generate a challenge, for example, a question and/or a test, for the requester to respond to. The challenge, for example, is context dependent. For example, the generated challenge pertains to the specific API and/or the specific requester. For example, the challenge can be related to a programming role of the requester associated with the request.

At 108, the hardware processor may receive a response to the challenge. The response, for example, may be a code or a few lines of program the requester is asked to provide. The response, for example, may be solving a problem. The response, for example, may be a graphical indication or a drawing image.

At 110, the hardware processor may, based on the response, facilitate the request for using the API. For example, the hardware processor can facilitate the request by permitting the use of the API based on receiving a satisfactory response. As another example, the hardware processor can facilitate the request by denying the use of the API based on receiving an unsatisfactory response.

Figure 2:
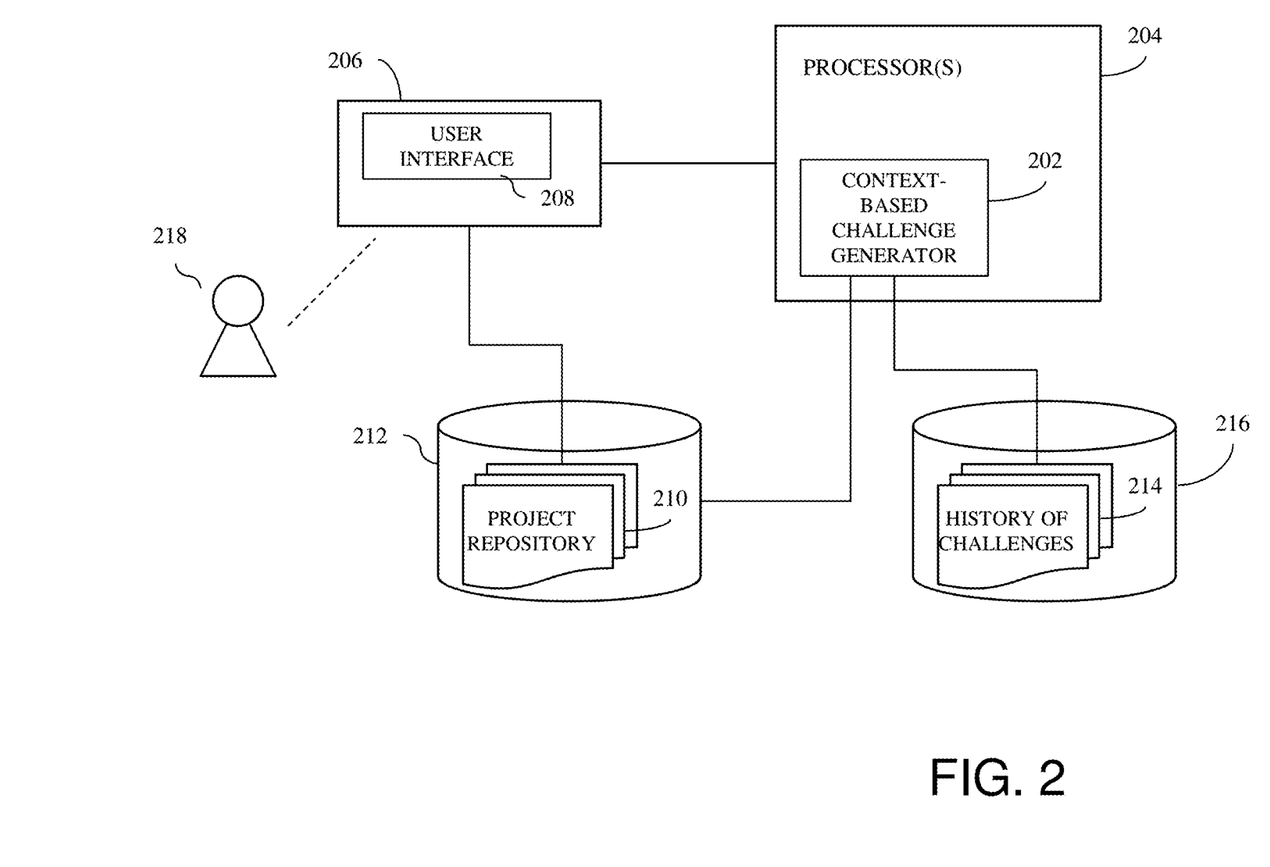
FIG. 2 is a diagram showing components of a system in one embodiment.

FIG. 2 is a diagram showing components of a system in one embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. While other computer or system components may exist for functioning of a computer, for simplicity, generally known computer components are not shown. One or more hardware processors may execute a method, for example, described above. For example, a context-based challenge generator 202 may run on one or more processors 204, and receive a request for use of an application programming interface (API) and determine context associated with the request. The context-based challenge generator 202 may be a function or a program of instructions executable or runnable on one or more processors 204. The context-based challenge generator 202 may determine context, for example, based on analyzing data associated with a project or program from which a request to use of API or an API call is detected or identified. Such data can be accessed or read from a project repository 210, for example, stored on a storage device 212. The context-based challenge generator 202 may also determine context based on analyzing history of challenges 214 and/or responses to the previous challenges stored on a storage device 216.

In some embodiments, the processor 204 may detect the request for use of an API, for instance, based on identifying an API call in a computer code or program, which for example, is being executed, or scheduled to be executed. In some embodiments, a user interface 208 (e.g., a graphical user interface) or a program running the user interface 208 may detect the request for use of an API, e.g., based on detecting a user 218 coding a program or executing a program code which calls an API. In some embodiments, the user interface 208 may be run by or on one or more processors 204. In other embodiments, the user interface 208 may be run on a user device 206 (e.g., one or more processors on a user device), for example, associated with a user, which may communicate the request to one or more processors 204. The user interface 208 may include any one or more of a web browser, a graphical code editor, and/or another GUI, for example, provided in an integrated computer programming environment, version control system, and/or another tool. The user interface 208 may include any other interface, which for example, can interact with a user.

Based on the context, the context-based challenge generator 202 may generate a challenge, for example, which can be used for determining whether to permit the use of the API. The challenge may be communicated to the user interface 208, which may present the challenge to the user 218.

The context-based challenge generator 202 may receive a response to the challenge, and based on the response, facilitate the request for using the API. For example, the context-based challenge generator 202 may determine whether the response is satisfactory or unsatisfactory. For example, the context-based challenge generator 202 may compare the response to a baseline threshold response, or another criterion, and if the response meets the threshold or criterion, the context-based challenge generator 202 may trigger an action that facilitates the use of the API, for example, by permits the use of the API. In some embodiments, facilitating the action may include allowing access to more information related to the API and/or access to advanced features of the API. If the response does not meet the threshold or criterion, the context-based challenge generator 202 may deny the use of the API. In this case, the context-based challenge generator 202 may generate another challenge, allowing another attempt or retry. A number of retires may be allowed.

As described above, one or more challenges or questions can be related to the API, for example, its features and/or risks. One or more challenges may include asking the user to perform an action that can demonstrate a programming skill and/or demonstrate knowledge of risk and/or security associated with the API.

In some embodiments, the context-based challenge generator 202 may be triggered based on one or more of requests by a user (e.g., to use the API), a location of a user, and/or a speed of programming by a specific user. In some embodiments, triggering and generating of challenge-response test (API CAPTCHA) are context dependent, for example, based on intended use. In some embodiments, the challenge-response test can apply to more than one API, e.g., a set of related APIs. In some embodiments, one or more questions or messages in the challenge may relate to the user cohort and/or programmer role in an organization. For example, the challenge-response test message may change depending on programmer experience and history. One or more questions, messages, or tests in the challenge-response test may be in the form of audio (e.g., audio message). One or more questions, messages, or tests in the challenge-response test may pop-up as part of a GUI in a program code editor or another visual alert.

In some embodiments, the context-based challenge generator 202 may learn the intended "usage" of the API, for example, by one or more of interacting with the developer, accessing and/or analyzing information related to intended system and/or context from the project repository, and/or analyzing the developer cohort.

In some embodiments, the test case or challenge may vary in an adaptive form based on the context of the API in correlation with user's previous challenges 214, for example, which allows for dynamically providing variably different challenges to the user 218. In some embodiments, challenges, for example, which can be provided in the form of pop-ups or visual alerts can be dynamically altered by contextually analyzing the functions of the library that the user is trying to use and inserting into the code for execution of an application.

Figure 5:
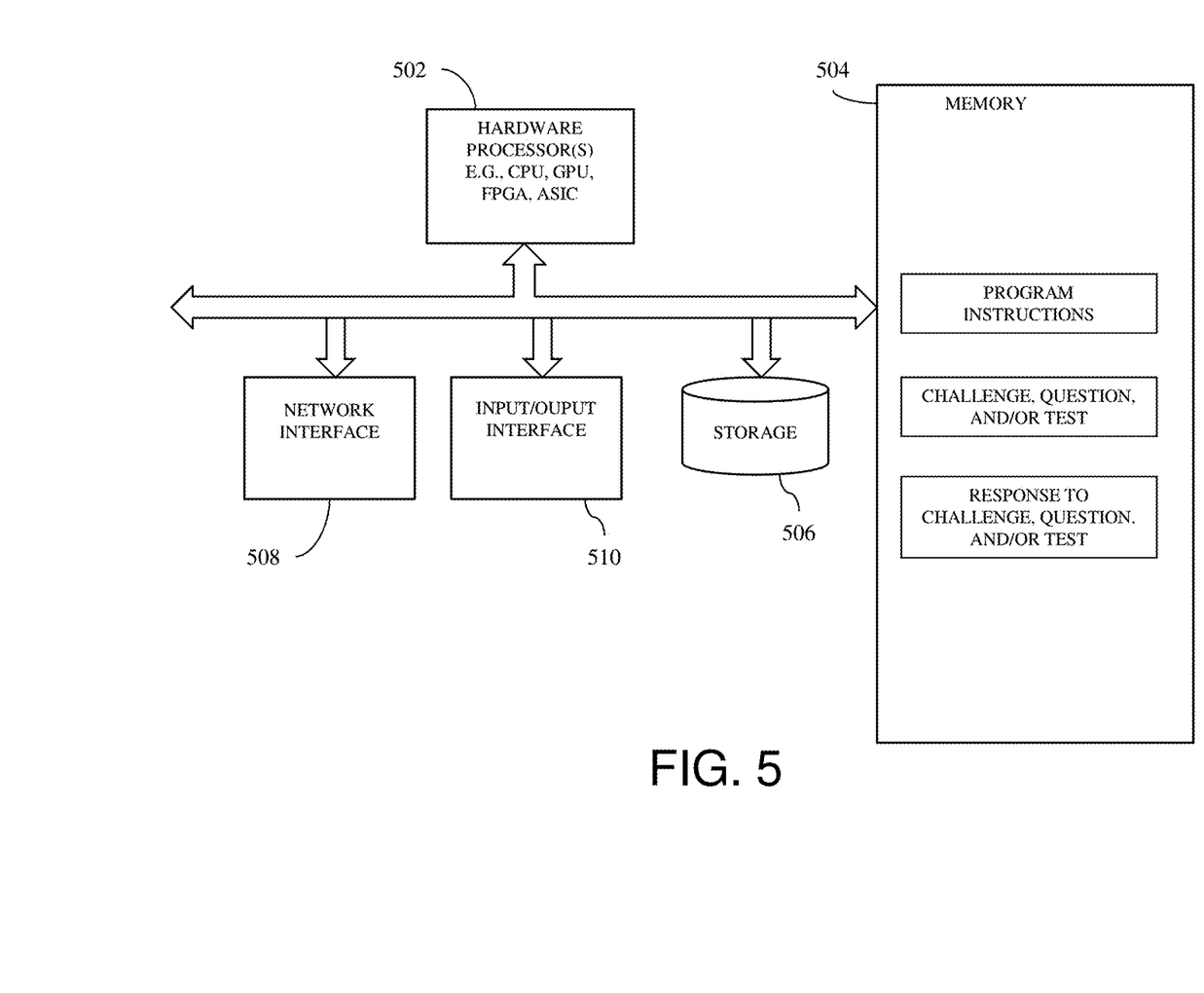
FIG. 5 is a diagram showing components of a system in one embodiment that can trigger and provide API challenge-response test.

FIG. 5 is a diagram showing components of a system in one embodiment that can trigger and provide API challenge-response test. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and generate a challenge for a user to solve, for example, in the process of using an API. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive a request for use of an API, for example, detected in a program code, program editor, or another. At least one hardware processor 502 may retrieve information associated with one or more of a project associated with the program code from which the API call is detected, information associated with the API, information associated with a requester of the API use, information associated with cohorts of the requester, past challenges presented to the requester and/or past challenges associated with the API (and/or one or more related APIs). Such information may be stored in a storage device 506 or received via a network interface 508 from a remote device, and may be temporarily loaded into a memory device 504 for determining context associated with the request for use of the API. Based on the context, at least one hardware processor 502 may generate a challenge, for example, for use in determining whether to permit the use of the API. Based on a response to the challenge, at least one hardware processor 502 may facilitate the request for using the API. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
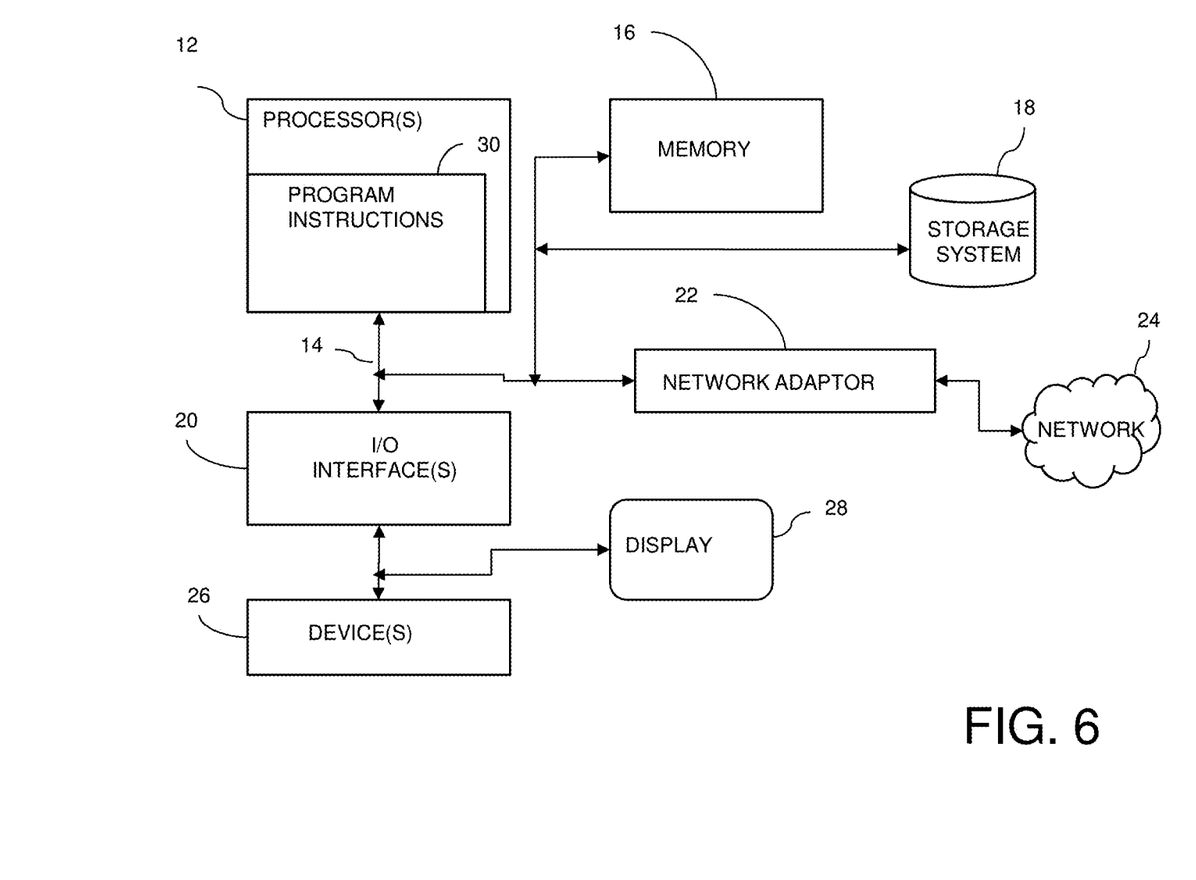
FIG. 6 illustrates a schematic of an example computer or processing system that may implement an API challenge-response test system according to one embodiment.

FIG. 6 illustrates a schematic of an example computer or processing system that may implement an API challenge-response test system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
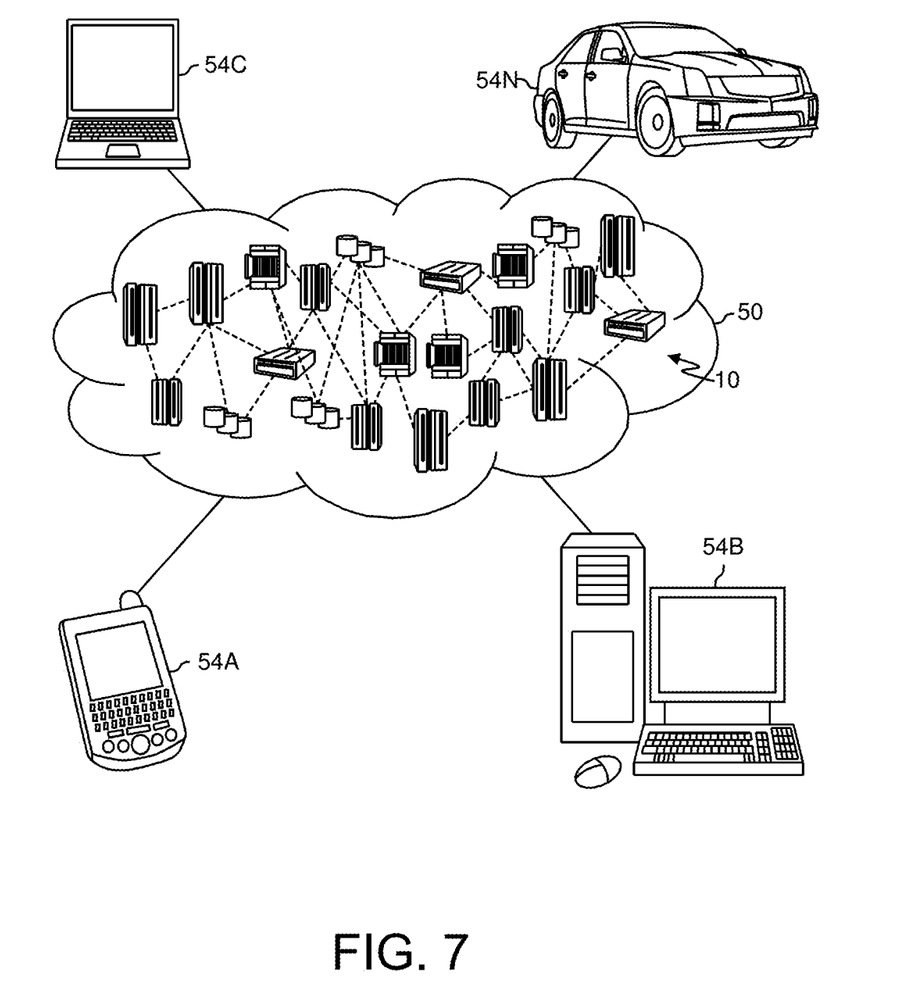
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
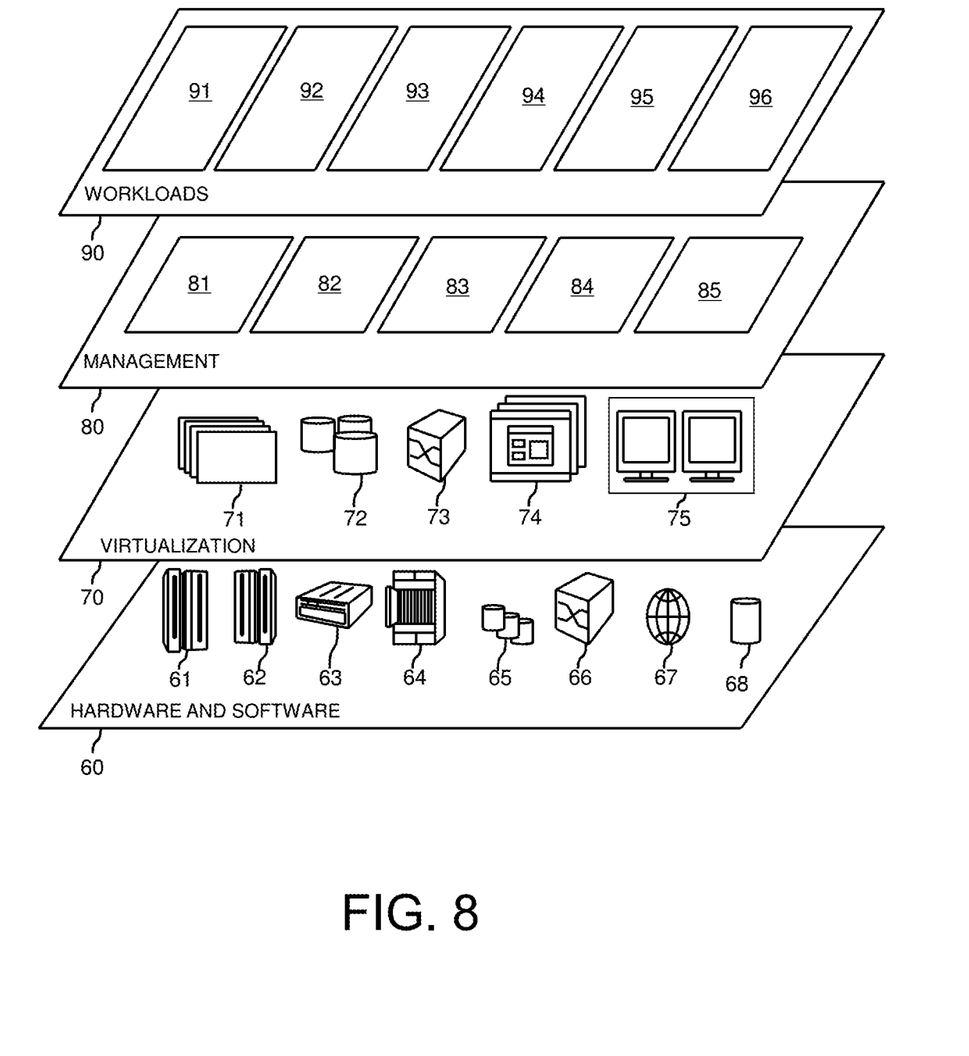
FIG. 8 illustrates a set of functional abstraction layers provided by cloud computing environment in one embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API CAPTCHA processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a hardware processor;
a memory coupled to the hardware processor;
the hardware processor operable to at least:
receive a request for use of an application programming interface (API);
determine context associated with the request;
based on the context, generate a challenge for determining whether to permit the use of the API;
receive a response to the challenge; and
based on the response, facilitate the request for using the API,
wherein the context includes at least information associated with the API, wherein the challenge probes a potential API user to demonstrate that the potential API user has an understanding of at least an aspect of the API.

2. The system of claim 1, wherein the request for use of an API comprises a request for use of a set of APIs.

3. The system of claim 1, wherein the hardware processor is operable to determine the context by learning intended usage of the API.

4. The system of claim 3, wherein the hardware processor learns the intended usage of the API by accessing data associated with a programming project in a project repository with which the request is associated.

5. The system of claim 3, wherein the hardware processor learns the intended usage of the API by causing a user interface to interact with a developer associated with the request, and receiving data from the developer interaction, wherein based on the data the hardware processor learns the intended usage of the API.

6. The system of claim 1, wherein the challenge is related to a programming role of a requester associated with the request.

7. The system of claim 1, wherein the context includes at least context associated with a requester of the request.

8. The system of claim 1, wherein the context includes at least information associated with a previous challenge presented to a requester of the request.

9. The system of claim 1, wherein the hardware processor is operable to facilitate the request by permitting the use of the API based on receiving a satisfactory response.

10. The system of claim 1, wherein the hardware processor is operable to facilitate the request by denying the use of the API based on receiving an unsatisfactory response.

11. The system of claim 1, wherein the hardware processor is operable to detect vulnerability in the API by learning from responses of the challenge-response tests.

12. A computer program product comprising a computer readable storage medium having program instructions embodied therewith, the program instructions executable by a device to cause the device to:
receive a request for use of an application programming interface (API);
determine context associated with the request;
based on the context, generate a challenge for determining whether to permit the use of the API;
receive a response to the challenge; and
based on the response, facilitate the request for using the API,
wherein the context includes at least information associated with the API, wherein the challenge probes a potential API user to demonstrate that the potential API user has an understanding of at least an aspect of the API.

13. The computer program product of claim 12, wherein the request for use of an API comprises a request for use of a set of APIs.

14. The computer program product of claim 12, wherein the device is caused to determine the context by learning intended usage of the API.

15. The computer program product of claim 14, wherein the device is caused to learn the intended usage of the API by accessing data associated with a programming project in a project repository with which the request is associated.

16. The computer program product of claim 14, wherein the device is caused to learn the intended usage of the API by causing a user interface to interact with a developer associated with the request, and receive data from the developer interaction, wherein based on the data the device is caused to learn the intended usage of the API.

17. The computer program product of claim 12, wherein the context includes at least information associated with a previous challenge presented to a requester of the request.

18. The computer program product of claim 12, wherein the device is caused to facilitate the request by permitting the use of the API based on receiving a satisfactory response.

19. The computer program product of claim 12, wherein the device is caused to facilitate the request by denying the use of the API based on receiving an unsatisfactory response.

20. A computer-implement method comprising:
receiving a request for use of an application programming interface (API);
determining context associated with the request;
based on the context, generating a challenge for determining whether to permit the use of the API;
receiving a response to the challenge; and
based on the response, facilitating the request for using the API,
wherein the context includes at least information associated with the API, wherein the challenge probes a potential API user to demonstrate that the potential API user has an understanding of at least an aspect of the API.

* * * * *